United States Patent [19]
Lowry

[11] Patent Number: 5,824,211
[45] Date of Patent: Oct. 20, 1998

[54] OIL RECLAMATION DEVICE

[75] Inventor: Charles A. Lowry, 3848 Overland Ave. #208, Culver City, Calif. 90232

[73] Assignee: Charles A. Lowry, Salt Lake City, Utah

[21] Appl. No.: 434,187

[22] Filed: May 3, 1995

[51] Int. Cl.⁶ .................................................. B01D 35/01
[52] U.S. Cl. ........................... 210/92; 210/438; 210/440; 210/442; 210/450; 196/46.1
[58] Field of Search ............................. 210/92, 180, 436, 210/438, 450, 472, 440, 453, 437, 442; 196/46.1

[56] References Cited

U.S. PATENT DOCUMENTS

| | | | |
|---|---|---|---|
| 1,613,467 | 1/1927 | Liddell | 210/92 |
| 2,472,717 | 6/1949 | Morey | 210/436 |
| 2,635,759 | 4/1953 | Scwalge | 210/180 |
| 2,839,196 | 6/1958 | Schwalge | 210/180 |
| 4,006,084 | 2/1977 | Priest | 210/180 |
| 4,115,201 | 9/1978 | Malec | 196/46.1 |
| 4,146,475 | 3/1979 | Forsland | 210/71 |
| 4,289,583 | 9/1981 | Engel | 196/115 |
| 4,454,037 | 6/1984 | Conterio et al. | 210/168 |
| 4,830,745 | 5/1989 | Meuler | 210/168 |
| 4,943,352 | 7/1990 | Lefebvre | 196/46.1 |
| 4,997,556 | 3/1991 | Yano et al. | 210/440 |
| 5,198,104 | 3/1993 | Meuyhert | 210/149 |
| 5,322,596 | 6/1994 | Arntz | 196/46.1 |

Primary Examiner—Matthew O. Savage

[57] ABSTRACT

An improved oil reclamation device for removing solid contaminates and water or other volatile contaminates from the engine lubricating oils and hydraulic fluids. More particularly, this oil reclamation device relates to a unique combination evaporation chamber and filter housing, and to an improved filter assembly. A first feature of this oil reclamation device is the improved utilization of space through the efficient combining of the filter and evaporation chambers within one compact housing, which utilization brings the benefits of a compact installation with a minimum difficulty of installation. Another benefit of this design is the efficient use of engine oil to heat the evaporation surface evenly and effectively without the need of any additional heat source. This design eliminates cold spots on the evaporation surface and the need for potentially dangerous heating elements. Further, many different types of filter elements and filtration ratings may be used. This wide variety of filters allows greater flexibility of operation so as to permit this oil reclamation device to be more well suited to customer specific applications.

16 Claims, 7 Drawing Sheets

OIL RECLAMATION DEVICE

FIELD OF THIS OIL RECLAMATION DEVICE

This disclosure generally relates to an oil filtration and reconditioning device used on internal combustion engines and in particular to an improved device utilizing a unique combination evaporation chamber and filter housing.

BACKGROUND OF THIS OIL RECLAMATION DEVICE

An improved oil reclamation device for removing solid contaminates and water or other volatile contaminates from the engine lubricating oils and hydraulic fluids. More particularly, this oil reclamation device relates to a unique combination evaporation chamber and filter housing, and to an improved filter assembly.

Oil reclamation devices of the general type disclosed and described are well known. These devices are used to remove both solid and liquid contaminates from the lubricating oil. Liquid contaminants such as condensates, water, and fuel are often emulsified in the lubricating oil and cannot be separated by a filter. It is therefore necessary that the lubricating oil of all internal combustion engines be changed at sufficiently regular intervals to minimize engine damage caused by contaminants. It is well known that oil in and of itself does not "wear out" but becomes unusable due to these aforementioned liquid and solid contaminates.

A number of devices have been proposed to remedy this problem while providing increased oil filtration. The following patents disclose the general state of the refining art: U.S. Pat. Nos. 2,839,196; 4,146,475; 4,289,583; 4,830,745; 4,943,352; 5,322,596; 1,613,467; 2,635,759; 2,472,717.

Numerous disadvantages are associated with these known devices. For example, all the above devices use large, bulky evaporation chambers with massive central hubs and protruding bosses, which assembly is highly wasteful both in space and heat retention efficiency thus making these units unsuitable for the vast majority of vehicle installations. In addition, these units require an additional heat source to maintain operating temperature. Thus, these units may not reach operating temperature on short trips. These additional heat sources are often electrical in nature necessitating an increased load on the vehicle electrical system and a significant increase in installation difficulty.

Figure 9A:
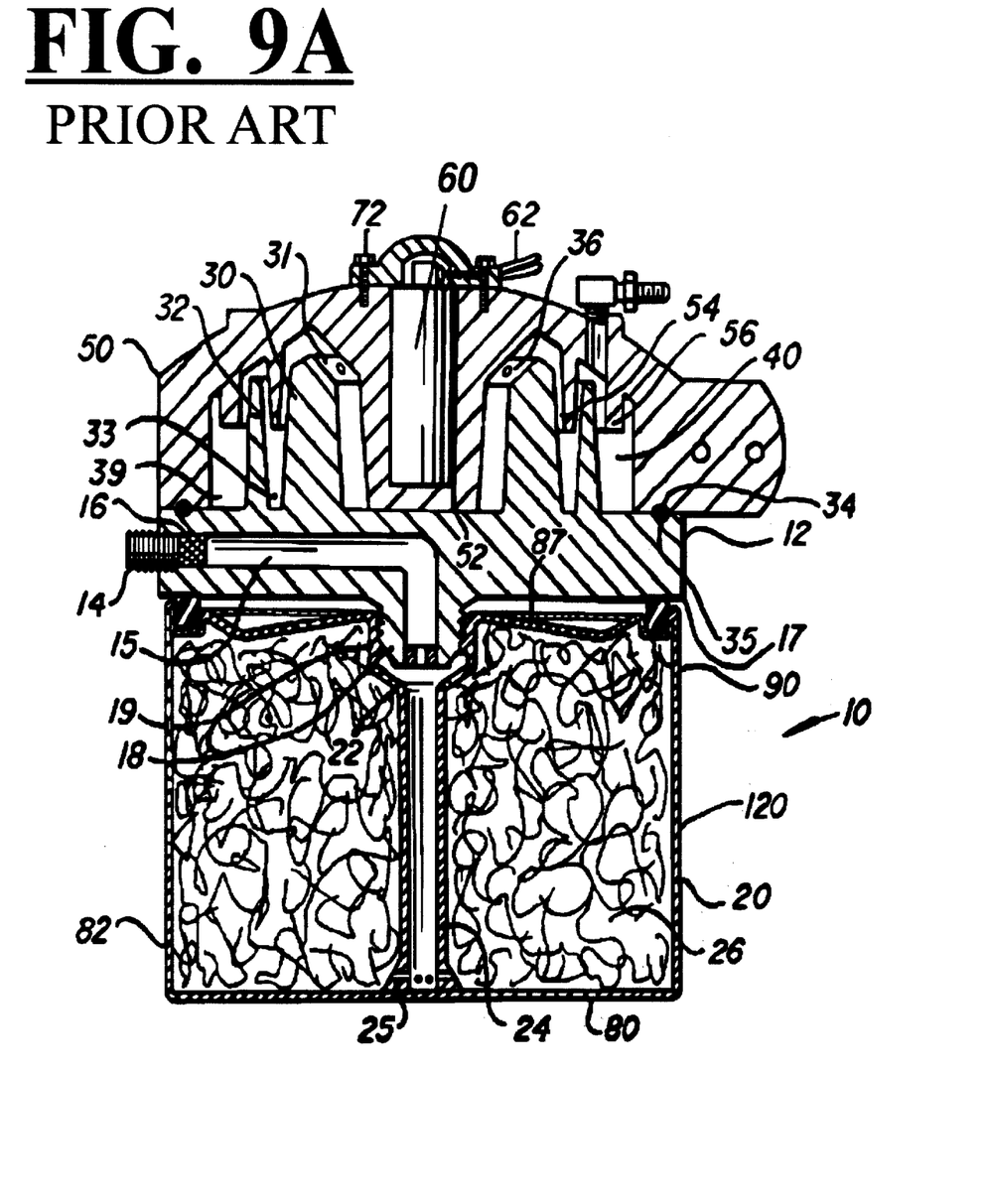
Figure 9B:
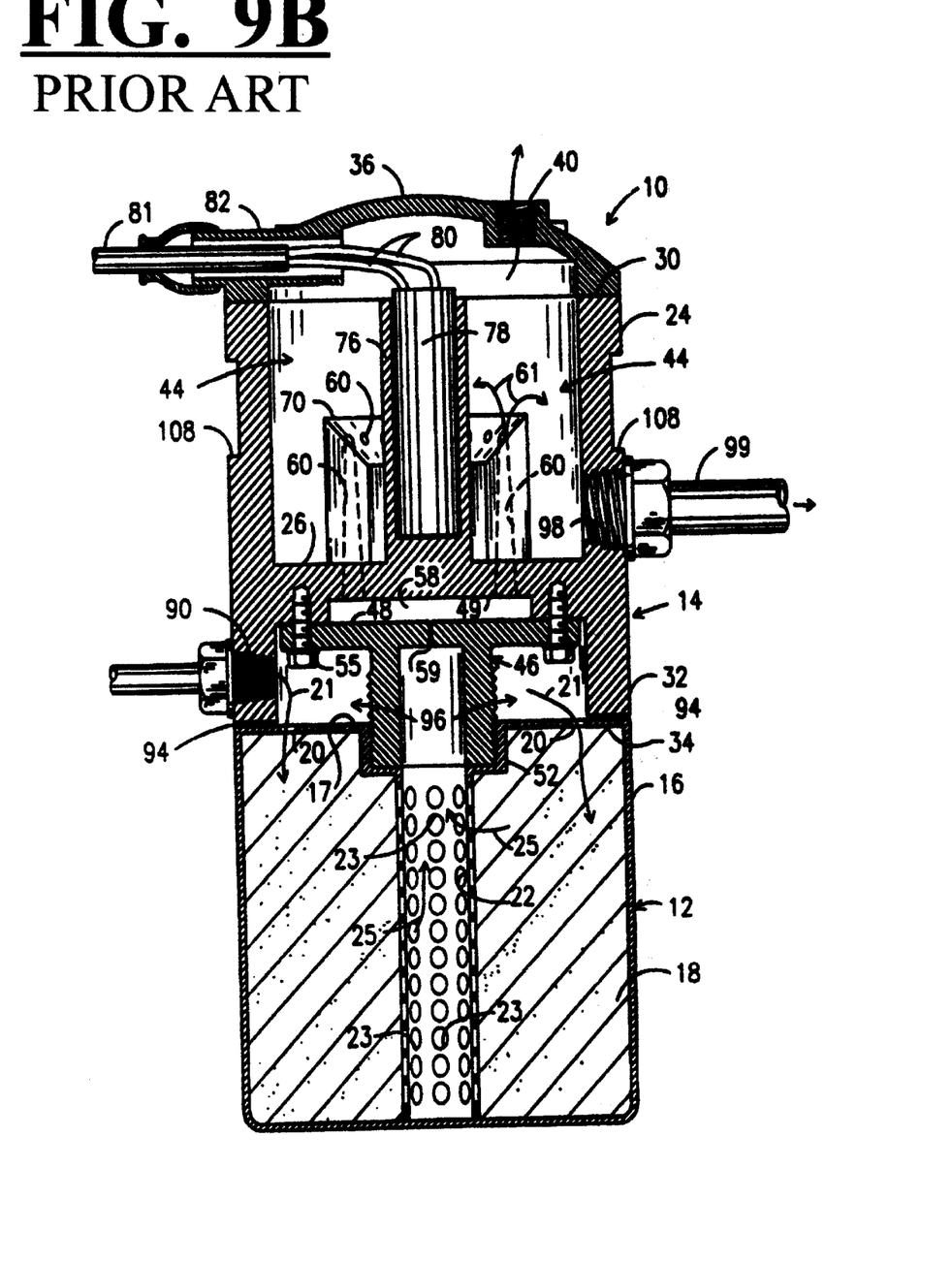

Numerals 60 of FIG. 9A and 78 of FIG. 9B illustrate examples of these additional heat sources.

Most of these heat sources directly heat explosive gases. Needless to say, such devices are dangerous. FIG. 9A from "Lefebvre" U.S. Pat. No. 4,943,352 issued Jul. 24, 1990 and FIG. 9B from "Arntz" U.S. Pat. No. 5,322,596 issued Jun. 21, 1994, both illustrate this problem. In addition, numerals 40 of FIG. 9A and 44 of FIG. 9B both refer to bulky, heat inefficient evaporation chambers. "Schwalge" U.S. Pat. No. 2,635,759 and "Morey" U.S. Pat. No. 2,472,717 illustrate other methods for heating engine oil. "Schwalge" Patent heats the engine oil by using exhaust gas to directly heat a "heating unit" placed within a "heating chamber". The oil is heated by being poured over this "heating unit". This method is extremely dangerous due to the heating of oil within an enclosure using unregulated exhaust gases whose temperature may well reach over 1000 degrees Fahrenheit. These high temperatures may easily cause the oil to burn with potentially disastrous results. "Morey" U.S. Pat. No. 2,472,717 heats the engine oil by pouring oil over a "heat distributing head" which is heated by a liquid "such as water or alcohol" thereby not efficiently utilizing the engine oil as a heat source. These designs and all other discovered relevant prior art exposes a large percentage of the outer walls of the evaporation chamber to the surrounding environment, promoting enormous heat loss which needs to be offset by the use of an additional heat source.

Recondensation of vapor upon the inner walls of these evaporation chambers occurs due to the reduced temperature of the chamber walls as a result of cooling caused by heat radiation, which recondensate is not vaporized off but drains back into to the oil thus drastically reducing efficiency.

These heat sources not only prove the inefficiency of these designs, but also present a fire and explosion hazard as a result of the potential burning of oil due to overheating and the proximity of these heat sources to explosive gases.

Yano U.S. Pat. No. 4,997,566 illustrates the use of a "chamber arraigned to generate a vertical flow of oil introduced therein, whereby the lubricant having little gaseous contaminates and therefore having a larger specific gravity gathers in a peripheral area of the chamber while gas-rich lubricant having a smaller specific gravity gathers in a central area."

This device solely filters and separates the oil. No provision is made nor intended for treating the oil for water, condensation and/or fuel contamination.

None of the prior art devices are designed to effectively utilize the operating engine oil as a safe heat source, nor does the prior art fashion an efficient evaporation chamber.

There remains a need for a combination filter and evaporator apparatus that is small enough for use in automotive and other small engine applications. Moreover there is a need for a design which is safe to use while allowing simplified installation and maintenance. However, at the time the present oil reclamation device was made, it was not obvious to those of ordinary skill in the art how those needs could be fulfilled, in view of the prior art as a whole.

SUMMARY OF THIS OIL RECLAMATION DEVICE

The longstanding but heretofore unfulfilled need for a combination filter and evaporator device of small size having means facilitating filter media replacement and simplified installation is now fulfilled by a construction that comprises a canister or housing including a housing tube or cylinder, a filter chamber, an evaporation chamber, an oil inlet, an oil drain, an oil sampling outlet, and a vapor vent. In addition, a housing cover or lid is employed to close the housing. The oil filter and evaporator tube or cylinder are located within the housing.

The housing filter chamber is the region between the outer cylinder and the evaporator cylinder, which region is bounded at the bottom by the base and at the top by the lid. The filter chamber does not include the region within the evaporator cylinder. The inside of the evaporator cylinder when closed in the housing by the base and lid comprises the evaporation chamber. Oil passageways extend through holes in the evaporator cylinder from the oil filter chamber into the evaporation chamber, whereupon the oil flows onto a coarse surface which surface facilitates the spreading of the oil into a thin film.

The evaporator cylinder is secured within the housing by recesses cut in the base of the housing and in the underside of the lid. The outer surface of the evaporator cylinder faces toward the filter and the inner surface of the evaporator cylinder has a coarse surface along which oil passes in a thin film.

The thin oil film is further promoted by restricting the oil flow rate. A small metered opening is placed within the path of the oil entering the filter chamber so that, in the preferred embodiment, the oil flow is restricted to a rate between two and eight gallons per hour, although other flow rates are within the scope of this oil reclamation device.

The design of this novel apparatus constrains oil entering the unit to flow first through the filter chamber portion of the housing and secondly through the evaporation chamber portion of the housing. A first feature of this oil reclamation device is the improved utilization of space through the efficient combining of the filter and evaporation chambers within one compact housing, which utilization brings the benefits of a compact installation with a minimum difficulty of installation. Another benefit of this design is the efficient use of engine oil to heat the evaporator cylinder evenly and effectively without the need of any additional heat source. This design eliminates cold spots on the evaporation surface and the need for potentially dangerous heating elements.

Additionally, the filter chamber may be insulated from heat loss by the inclusion of an insulative sleeve or coating on the inner, outer, or both surfaces of the housing cylinder. This insulation further increases evaporation chamber efficiency by maintaining the oil at a higher temperature, thus increasing vaporization of volatiles.

Thus it is understood that a primary object of this oil reclamation device is to advance the art of oil reclamation units by providing a device with an easily replaceable filter, a more effective utilization of space through the efficient combination of filter and evaporation chambers, a simpler and more effective evaporation means, and safer operation.

These and other important objects, features and advantages of this oil reclamation device will become apparent as this description proceeds.

This oil reclamation device accordingly comprises the features of construction, combination of elements and arrangement of parts that will be exemplified in the construction hereinafter set forth, and the scope of this oil reclamation device will be indicated in the claims.

BRIEF DESCRIPTION OF THE DRAWINGS

Other objects of this oil reclamation device will appear in the following description and appended claims, reference being made to FIGS. 1–8 forming a part of the specification wherein like reference characters designate corresponding parts.

FIG. 9A shows FIG. 4 of Lefebvre U.S. Pat. No. 4,943,352, issued Jul. 24, 1990. This figure is to be used as reference only. The numerical designations in this figure do not coincide with the designations used in FIGS. 1 through 8.

FIG. 9B shows FIG. 3 of Arntz U.S. Pat. No. 5,322,596, issued Jun. 21, 1994. This figure is to be used as reference only. The numerical designations in this diagram do not coincide with the designations used in FIGS. 1 through 9A.

LIST OF REFERENCE NUMERALS

10 Oil reclamation device housing.
12 Housing filter chamber.
14 Housing evaporation chamber.
16 Housing base.
18 Base plate oil drain bore.
20 Base plate oil sampling bore.
22 Base plate oil inlet bore.
24 Oil inlet filter screen.
26 Oil inlet metering jet.
28 Base vent bore.
30 Base to filter sealing ridge.
32 Housing cylinder to housing base union.
34 Housing cylinder to housing base oil seal.
36 Housing base evaporator cylinder recessed groove.
38 Housing base to evaporator cylinder oil seal.
40 Housing cylinder.
42 Housing cylinder to lid oil seal.
44 Housing cylinder to lid union.
46 Lid.
48 Lid to filter sealing ridge.
50 Lid evaporator cylinder recessed groove.
52 Lid to evaporator cylinder oil seal.
54 Oil filter element.
56 Evaporator cylinder.
58 Evaporator cylinder oil passage holes.
60 Evaporator cylinder coarse surface.
62 Evaporation chamber vent.
64 Outer cylinder insulation.

DETAILED DESCRIPTION OF SPECIFIC EMBODIMENTS

The preferred embodiment and best mode of this oil reclamation device is shown by FIGS. 1–6. Alternate embodiments are shown by FIGS. 7 and 8.

Figures 1, 2, 3:
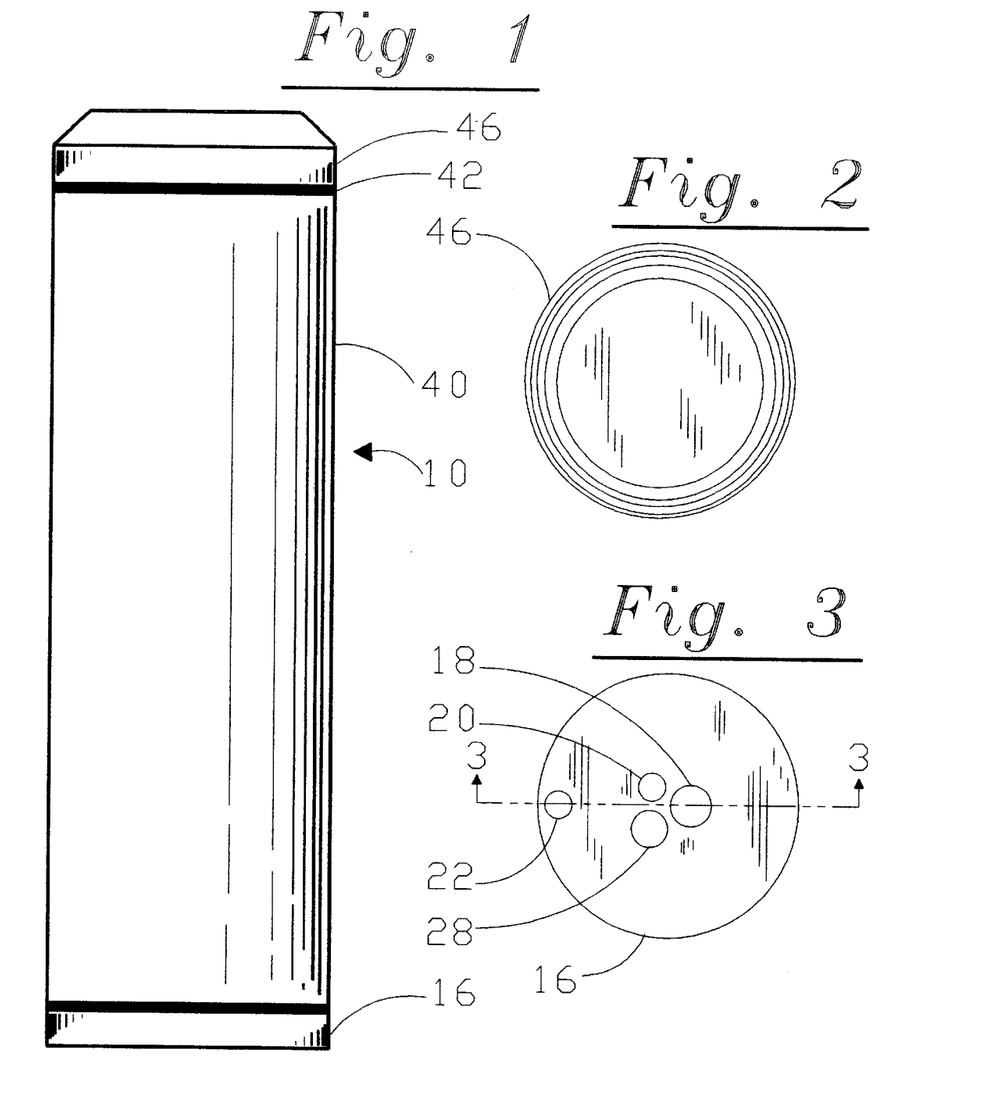
FIG. 1 shows a front elevational view of this oil reclamation device.
FIG. 2 shows a top plan view of this oil reclamation device.
FIG. 3 shows a bottom plan view of this oil reclamation device.
Figure 4:
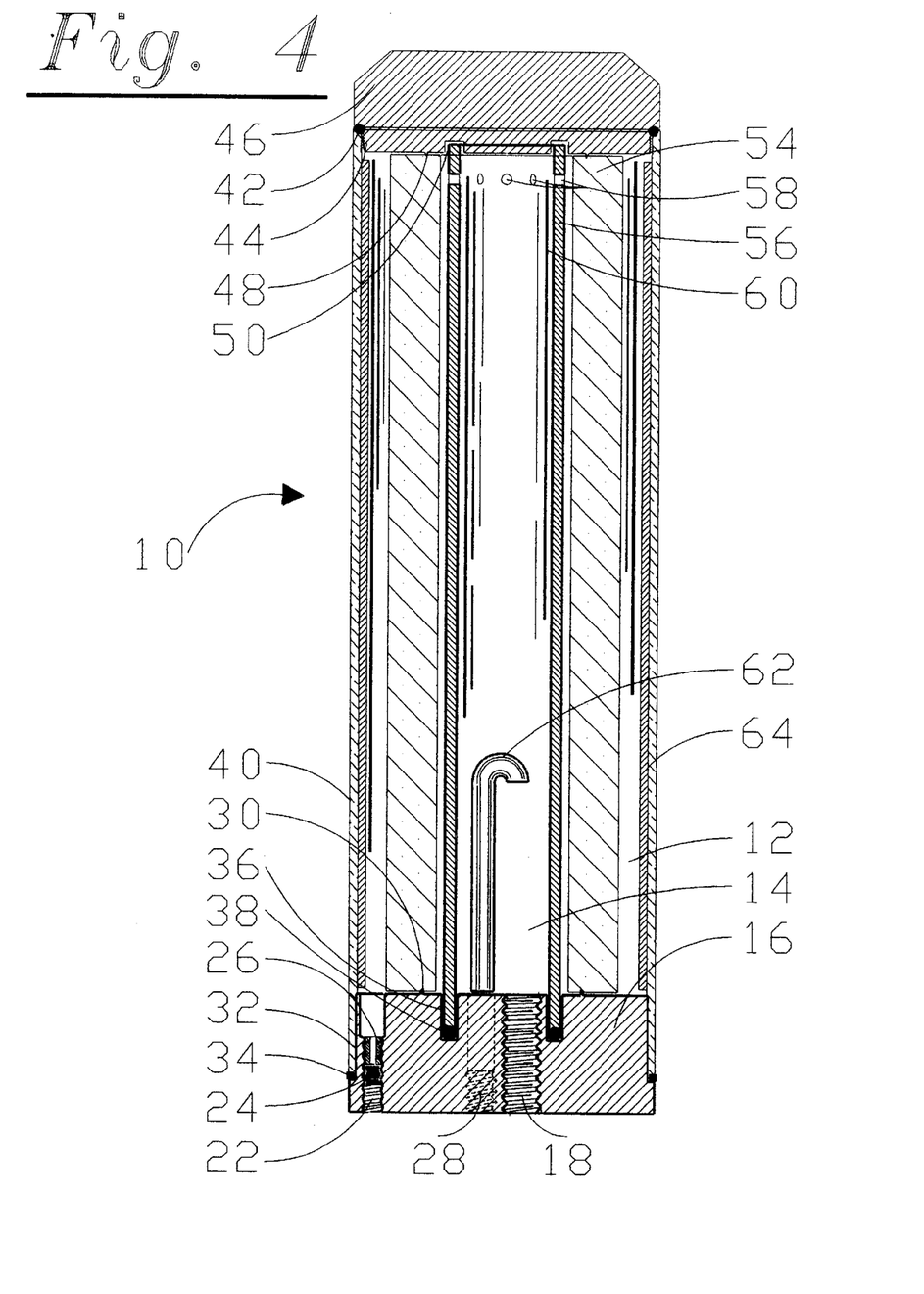
FIG. 4 shows a longitudinal sectional view of the preferred embodiment of this oil reclamation device, said view being taken along line 3—3 in FIG. 3.

Referring now to FIG. 1 and 4, it will there be seen that an exemplary embodiment of the present oil reclamation device is denoted as a whole by the reference numeral 10.

Reclamation device 10 consist primarily of a housing which embodies filter chamber 12 and evaporation chamber 14. The housing itself consist of a tube or cylinder 40 and a base 16. The housing is assembled by threadedly engaging or pressing base 16 into one end of cylinder 40 at point 32 while the other end of cylinder 40 threadedly engages lid 46. The resultant construction somewhat resembles an open bottle or Thermos jar.

Figure 7:
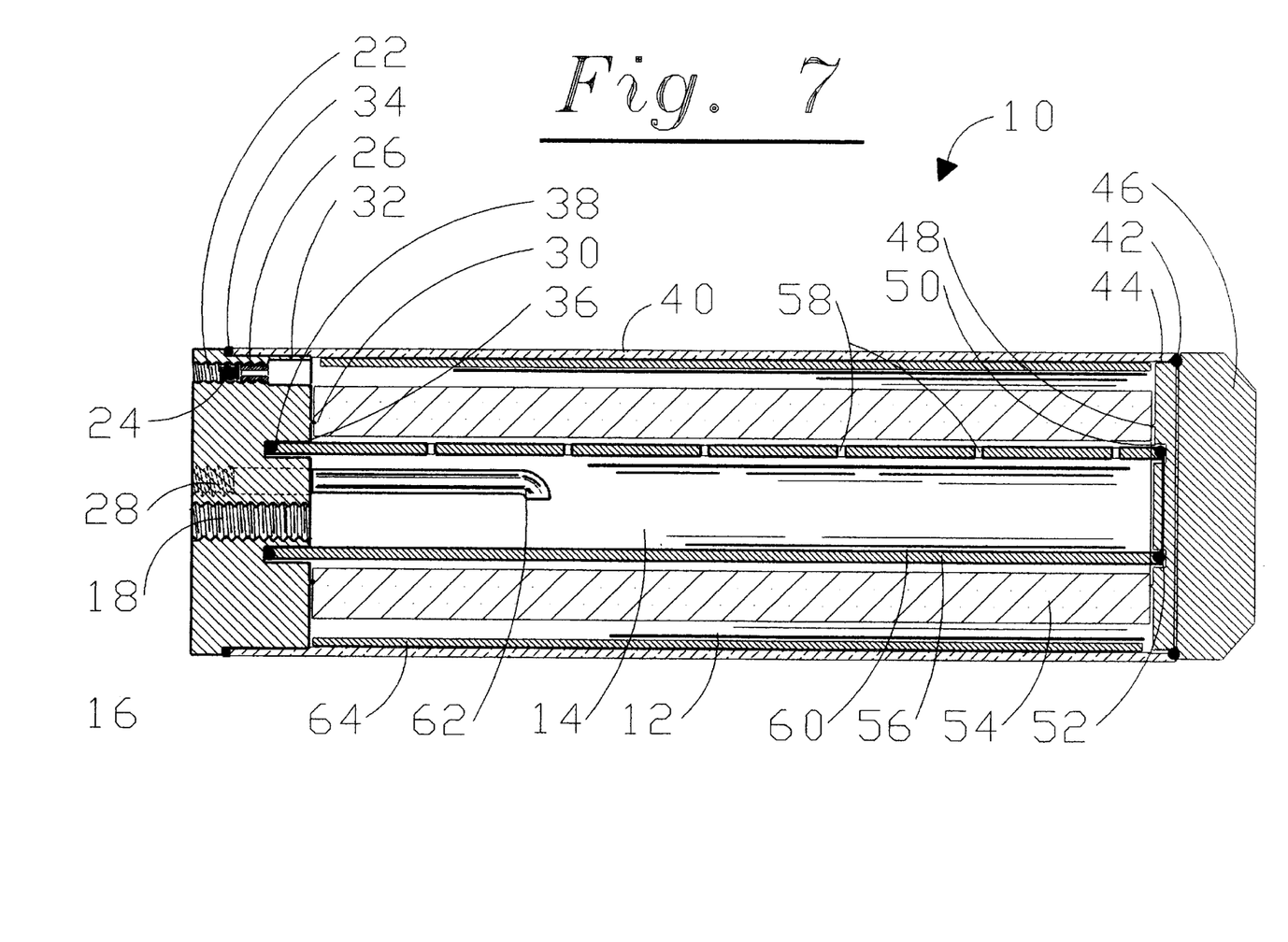
FIG. 7 is a longitudinal sectional view of an alternate embodiment made in accordance with this oil reclamation device, said view being taken along line 3—3 of FIG. 3.
Figure 8:
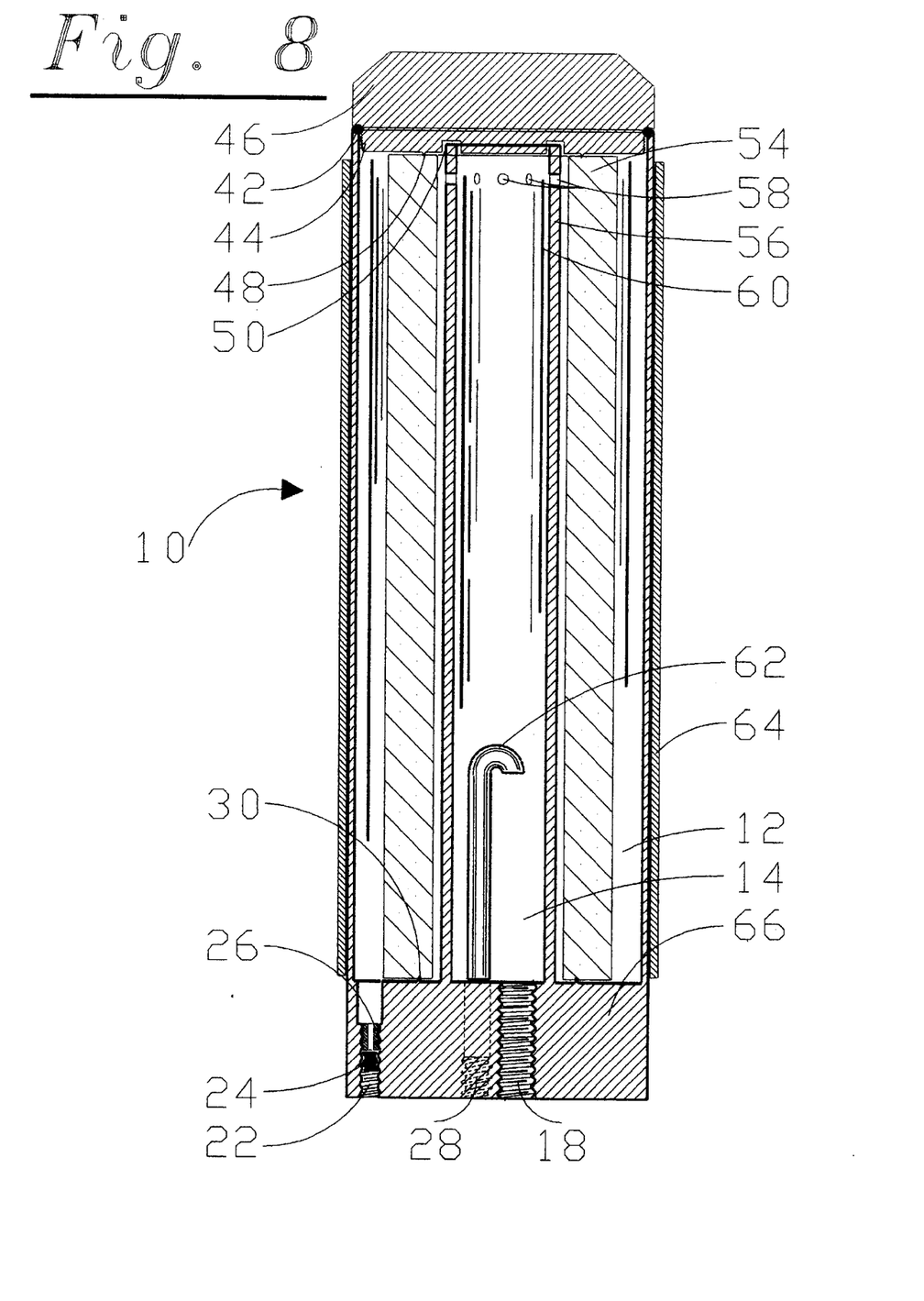
FIG. 8 is a longitudinal sectional view of another alternate embodiment made in accordance with this oil reclamation device, said view being taken along line 3—3 of FIG. 3.

Referring to FIGS. 4, 7, and 8, we notice that within this housing is secured evaporator cylinder 56. Evaporator cylinder 56 is secured within the housing by means of insertion of the lower ends of evaporator cylinder 56 into the recessed groove 36, which is cut in base 16. This evaporator cylinder effectively divides the internal space of the housing into two sections.

The region designated housing filter chamber 12 is the region between cylinder 40 and evaporator cylinder 56 and enclosed by base 16 and lid 46 and not including the region inside said evaporator cylinder 56. Housing filter chamber 12 contains oil filter element 54 and is supplied with oil by oil inlet 22. Oil inlet 22 contains oil inlet filter screen 24 and oil inlet metering jet 26. The placement of screen 24 is such that all oil entering the unit must first pass through this screen, which filters all particles capable of obstructing or clogging metering jet 26, thus insuring the continued flow of properly metered oil into the unit. The oil metering jet 26 is sized such as to allow an oil flow rate between 2 and 8 gallons per hour to pass through the unit, although other flow rates are within the scope of this oil reclamation device. In the preferred embodiment, the oil is metered by use of metering jet 26, which is threadedly engaged in oil inlet 22. The use of a tube instead of a threaded jet is acceptable and well within the scope of this oil reclamation device.

Referring to FIGS. 4, 7, and 8, housing filter chamber 12 may encompass or be encompassed by an insulative sleeve or coating 64. The filter chamber contains filter element 54, which filter element is secured in place by being inserted around and supported by evaporator cylinder 56. Many different types of filter elements and filtration ratings may be used as filter element 54, including but not limited to cartridges of spun or pleated polypropylene, polyester, or resinbonded cellulose melamine. Other types of filters may include wire mesh, ceramic, or sintered bronze. This wide variety of filters allows greater flexibility of operation so as to make this oil reclamation device more well suited to customer specific applications. In the preferred embodiment, oil and temperature resistant spun polypropylene capable of filtering 1 micron nominal is the preferred filter media, although as previously stated a wide variety of filter media is within the scope of this oil reclamation device.

Figure 5:
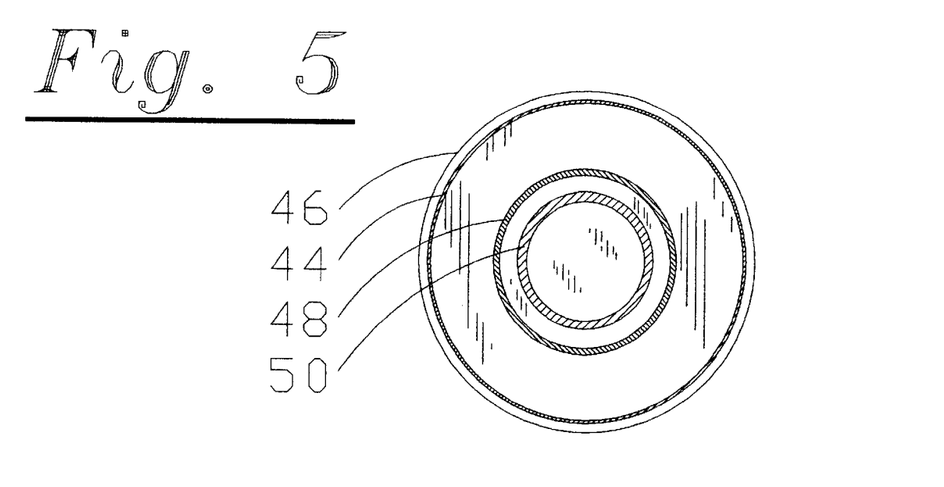
FIG. 5 shows a bottom plan view of the lid.
Figure 6:
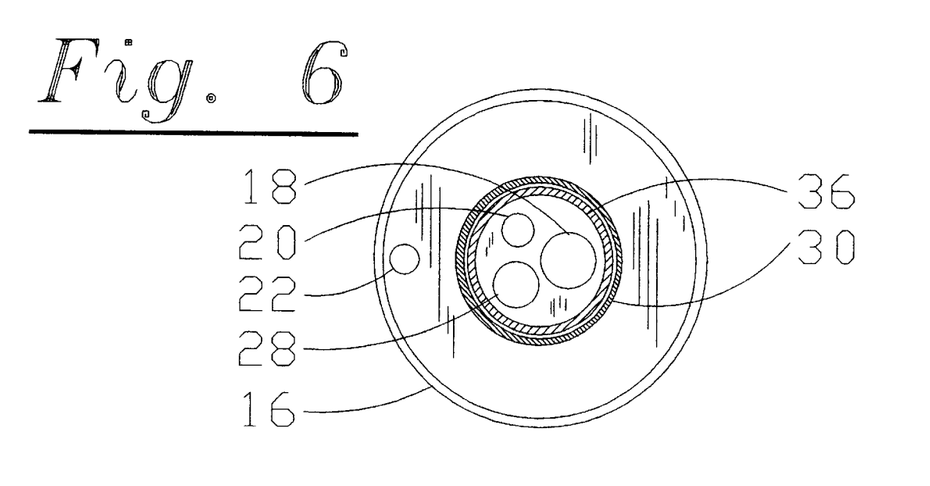
FIG. 6 shows a top plan view of the housing base plate means.

In the preferred embodiment, filter element 54 is sealed against oil bypass by housing base to filter sealing ridge 30 and lid to filter sealing ridge 48, which ridges compress against the ends of filter 54 thereby eliminating oil bypass and insuring only filtered oil enters evaporation chamber 14 (best shown in FIGS. 4, 5, and 6). Other filter types may require alternate sealing methods, such as but not limited to rubber washers, o-rings, pressed fittings, and the like. This and other similar filter sealing technologies are well known and well within the scope and design of this oil reclamation device.

Referring to FIGS. 4, 7, and 8, the region designated housing evaporation chamber 14 is the region inside evaporator cylinder 56 and enclosed at its ends by base 16 and lid 46. This region contains oil drain bore 18, oil sample bore 20, vapor vent bore 28, evaporation chamber vent 62, evaporator oil passage holes 58, and evaporator cylinder coarse surface 60. Referring to FIGS. 3 and 6, oil drain bore 18 provides an outlet passage for the purified oil to return to the engine, oil sampling bore 20 provides a passage for gathering oil samples for in-use oil evaluation, vent bore 28 provides a passageway for the vaporized contaminates and also serves as a mounting hole for vent 62. Vent 62 performs the function expressed by its name. Oil enters evaporation chamber 14 through evaporator cylinder oil passage holes 58 whereupon the introduced oil flows onto the inner surface of evaporator cylinder 56, which has a coarse surface in order to promote the formation of a thin layer of oil, and is denoted evaporator cylinder coarse surface 60.

In the preferred embodiment, evaporator cylinder oil passage holes 58 are placed very near the top of evaporator cylinder 56 so as to maximize the distance the oil flows down evaporator cylinder coarse surface 60 (FIGS. 4 and 8). Evaporator cylinder 56 is sealed against oil seepage about the lower end by placing oil seal 38 within base evaporator cylinder recessed grove 36, which oil seal is held in place and compressed by evaporator cylinder 56, which evaporator cylinder 56 is itself compressed by the action of threadedly engaging lid 46.

As best shown in FIGS. 2, 4, and 5, the top of cylinder 40 is sealed by lid 46, which lid includes lid evaporator cylinder recessed groove 50 and housing to lid oil seal 42. In the preferred embodiment, lid 46 is threadedly engaged at point 44 onto cylinder 40 and compresses oil seal 42 to effect an efficient oil seal.

As best shown in FIGS. 4 and 7, the bottom of cylinder 40 is sealed by base 16 and secured at point 32 by either a compression fit or by being threadedly engaged. Oil leakage is controlled by housing cylinder to housing base oil seal 34, which is compressed between cylinder 40 and base 16 to effect an efficient oil seal. Other methods for securing and sealing the housing cylinder to said housing base and said lid are well known and well within the scope of this oil reclamation device.

In an alternate embodiment, FIG. 7 illustrates a similar unit which is designed to be installed horizontal instead of the preferred vertical, which alternate mounting position requires the evaporator cylinder oil passage holes 58 to be positioned along the horizontal top portion of the evaporator cylinder so as to promote an even thin film throughout the entire area of evaporator cylinder coarse surface 60 in this horizontal orientation. Evaporator cylinder 56 in this embodiment needs to be sealed against oil seepage across both evaporator cylinder ends. This is accomplished by placing an oil seal (FIGS. 4, 5, and 6) into base evaporator cylinder recessed grove 36 and lid evaporator cylinder recessed groove 46. Housing base recessed grove 36 receives oil seal 38 while lid recessed grove 50 receives oil seal 52. Oil sealing is accomplished in the same manner as in the preferred embodiment.

FIG. 8 illustrates yet another embodiment of this oil reclamation device wherein the above stated embodiments may be simplified in elements and construction through the use of casting or injection molding techniques, wherein housing cylinder 40, base 16, evaporator cylinder 56, vent bore 28, evaporation chamber vent 62, oil drain bore 18, oil sampling bore 20, oil inlet bore 22, oil inlet metering jet 26, and filter sealing ridge 30 are combined into one unitary unit. Thus items 32, 34, 36, and 38 are eliminated in this embodiment. The reduction in parts and manufacturing of such an embodiment is obvious and easily ascertained from the above description. The manufacturing techniques mentioned above are well known and well within the embodiment of this oil reclamation device.

DESCRIPTION OF OPERATION

The preferred embodiment and best mode of this oil reclamation device is shown by FIGS. 1–6. Alternate embodiments are shown by FIGS. 7 and 8.

In operation the contaminated oil containing impurities such as dirt, silica, water, sulfuric acid ($H_2SO_4$), fuel and the like enters oil reclamation device 10 by way of oil inlet 22 through oil inlet filter screen 24 and metering jet 26. Metering jet 26 regulates the rate of oil flow into filter chamber 12, which oil then passes through oil filter element 54. Due to the pressure maintained by the oil pump of the internal combustion engine, the oil then works its way to evaporator cylinder passage holes 58 which provides passage of the oil from filter chamber 12 to evaporation chamber 14. The oil upon entering evaporation chamber 14 flows onto evaporator cylinder coarse surface 60 where the oil forms a thin film upon surface 60 and flows by force of gravity to oil drain bore 18, whereupon said oil returns to the engine. While the oil is in a thin film upon surface 60, the volatiles within the oil vaporize and exit through vent 62.

By this point a large percentage of the solid impurities have been captured by the inlet screen 24 and filter element 54, while a large percentage of the volatile impurities have been removed by the operation of evaporation chamber 14.

Oil sampling bore 20 is provided to allow testing of the oil while the unit is in operation. The oil to be tested may pass through sampling bore 20 to be collected for testing.

This oil refinement process is a continues process which removes the solid and liquid contaminates on each cycling of the oil. Thus this oil reclamation device allows a vastly enhanced time and mileage interval between oil changes.

Although the construction of the alternate embodiments as cited in the section DETAILED DESCRIPTION OF SPECIFIC EMBODIMENTS is slightly different than the preferred embodiment, the description of the operation of the alternate embodiments is identical to the preferred embodiment in concept and function.

While the operation and description of this oil reclamation device has been addressed in terms of oil purification, the term oil could emphasize hydraulic fluid or any other lubricant or fluid which requires cleaning to maintain its original purpose.

This oil reclamation device is clearly new and useful. Moreover, it was not obvious to those of ordinary skill in the art at the time it was made, in view of the prior art considered as a whole as required by law.

It will thus be seen that the objects set forth above, and those made apparent from the foregoing description, are efficiently attained and since certain changes may be made in the above construction without departing from the scope of this oil reclamation device, it is intended that all matters contained in the foregoing construction or shown in the accompanying drawings shall be interpreted as illustrative and not in a limiting sense.

It is also to be understood that the following claims are intended to cover all of the generic and specific features of this oil reclamation device herein described, and all statements of the scope of this oil reclamation device which, as a matter of language, might be said to fall therebetween.

I claim:

1. An oil reclamation device for removing the impurities and contaminates of particles and liquids from lubricating oils, comprising
    (a) a housing including a base, an outer cylinder having first and second open ends, the first open end of said outer cylinder being mounted axially to said base and projecting axially from said base, base attachment means to removably attach said base to the first end of the outer cylinder, an inner cylinder having first and second open ends, said inner cylinder having an outer diameter less than an inner diameter of said outer cylinder, said inner cylinder being mounted within said outer cylinder with the first end of the inner cylinder engaged axially to said base and projecting axially from said base;
    (b) a filter positioned between said outer cylinder and said inner cylinder;
    (c) an oil inlet bore positioned radially between said outer cylinder and said inner cylinder and extending through said base so as to allow passage of oil from outside the device into a space between the filter and outer cylinder so as to direct the flow of oil through the filter toward the inner cylinder;
    (d) an evaporation chamber within said housing, the base defining a lower limit thereof, the inner cylinder defining an outermost periphery thereof;
    (e) an oil drain bore opening into said evaporation chamber and extending through said base to allow passage of oil to a location outside the device;
    (f) a vent comprising a vent bore extending through said base, a vent tube positioned within said evaporator chamber having first and second open ends, means for fluidly connecting the first end of said vent tube to said vent bore, wherein the second end of said vent tube is spaced axially from said base to allow passage of air and vapor from said evaporation chamber to a location outside the device;
    (g) a filter chamber within said housing, the base defining a lower limit thereof, the outer cylinder defining an outermost periphery thereof, the inner cylinder defining an innermost periphery thereof;
    (h) a lid engaged axially with the second end of said outer cylinder and the second end of said inner cylinder, lid attachment means for removably attaching said lid to the second open end of said outer cylinder for, wherein said lid closes said filter chamber and said evaporation chamber and defines an upper limit of said filter chamber and said evaporation chamber;
    (i) wherein said inner cylinder includes fluid passage means for enabling fluid to flow from said filter chamber into said evaporation chamber.

2. The apparatus of claim 1, further including an oil metering jet located within said oil inlet bore for constraining fluid flow to said filter chamber.

3. The apparatus of claim 1, further including an oil sampling bore positioned opening into said evaporation chamber and extending through said base to allow passage of oil.

4. The apparatus of claim 1, further including an insulative substance located about an outer surface of the outer cylinder.

5. The apparatus of claim 1, further including a sealing gasket positioned on a gasket seat defined on the lid for engagement with the second end of said outer housing to provide a leakproof seal between the second end of the outer housing and said lid.

6. The apparatus of claim 5, further including a sealing gasket positioned on a gasket seat defined on the base for engagement with the first end of said outer housing to provide a leakproof seal between the second end of the outer housing and the base.

7. The apparatus of claim 6, further including a sealing gasket positioned on a gasket seat defined in the lid for engagement with the second end of said inner cylinder to provide a leakproof seal between the second end of the inner cylinder and the lid.

8. The apparatus of claim 7, further including a sealing gasket positioned on a gasket seat defined on the base for engagement with the first end of said inner cylinder to provide a leakproof seal between the first end of the inner cylinder and the base.

9. The apparatus of claim 8, further including a coarse surface machined into an inner surface the evaporator cylinder for promoting a thin film of oil.

10. An oil reclamation device for removing the impurities and contaminates of particles and liquids from lubricating oils, comprising (a) a housing including a base, an outer cylinder, an inner cylinder having an outer diameter less than an inner diameter of the outer cylinder and being positioned within said outer cylinder, said outer and inner cylinders each having first and second ends, the first end of said outer cylinder being unitary with said base and projecting axially from said base, the second end of said outer cylinder being open, the first end of said inner cylinder being unitary with said base about the center of the base and projecting axially from said base, the second end of said inner cylinder being open;

(b) a filter positioned between said outer cylinder and said inner cylinder;

(c) an oil inlet bore positioned radially between said outer cylinder and said inner cylinder and extending through said base so as to allow passage of oil from outside the device into a space between the filter and outer cylinder so that the oil flows through the filter toward the inner cylinder;

(d) an evaporation chamber within said housing, the base defining a lower limit thereof, the inner cylinder defining an outermost periphery thereof;

(e) an oil drain bore opening into said evaporation chamber and extending through said base to allow passage of oil to a location outside the device;

(f) a vent comprising a vent bore extending through said base, a vent tube positioned within said evaporator chamber having first and second open ends, means for fluidly connecting the first end of said vent tube to said vent bore, wherein the second end of said vent tube is spaced axially from said base to allow passage of air and vapor from said evaporation chamber to a location outside the device;

(g) a filter chamber within said housing, the base defining a lower limit thereof, the outer cylinder defining an outermost periphery thereof, the inner cylinder defining an innermost periphery thereof;

(h) a lid, lid attachment means for removably attaching said lid to the second open end of said outer cylinder, said lid including sealing means for sealingly closing said filter chamber and said evaporation chamber, said lid defining an upper limit of said filter chamber and said evaporation chamber;

(i) wherein said inner cylinder includes fluid passage means for enabling fluid to flow from said filter chamber into said evaporation chamber.

11. The apparatus of claim 10, further including an oil metering jet located within said oil inlet bore for constraining fluid flow to said filter chamber.

12. The apparatus of claim 10, further including an oil sampling bore positioned opening into said evaporation chamber and extending through said base to allow passage of oil.

13. The apparatus of claim 10, further including an insulative substance located about an outer surface of the outer cylinder.

14. The apparatus of claim 10, further including a sealing gasket positioned on a gasket seat defined on the lid for engagement with the second end of said outer housing to provide a leakproof seal between the second end of the outer housing and said lid.

15. The apparatus of claim 14, further including a sealing gasket positioned on a gasket seat defined in the lid for engagement with the second end of said inner cylinder to provide a leakproof seal between the second end of the inner cylinder and the lid.

16. The apparatus of claim 15, further including a coarse surface machined into an inner surface the evaporator cylinder for promoting a thin film of oil.

* * * * *